(12) United States Patent
Rumynin et al.

(10) Patent No.: US 6,938,061 B1
(45) Date of Patent: Aug. 30, 2005

(54) PARALLEL COUNTER AND A MULTIPLICATION LOGIC CIRCUIT

(75) Inventors: Dmitriy Rumynin, Coventry (GB); Sunil Talwar, Warwickshire (GB); Peter Meulemans, Coventry (GB)

(73) Assignee: Arithmatica Limited, Leamington Spa (GB)

( * ) Notice: Subject to any disclaimer, the term of this patent is extended or adjusted under 35 U.S.C. 154(b) by 382 days.

(21) Appl. No.: 09/637,532

(22) Filed: Aug. 11, 2000

(30) Foreign Application Priority Data

Aug. 4, 2000 (GB) .............................. 0019287

(51) Int. Cl.[7] .............................................. G06F 7/00
(52) U.S. Cl. ...................................... 708/210; 708/626
(58) Field of Search ................................ 708/210, 626

(56) References Cited

U.S. PATENT DOCUMENTS

| | | | |
|---|---|---|---|
| 3,634,658 A | 1/1972 | Brown ................... | 235/92 LG |
| 3,757,098 A | 9/1973 | Wright ..................... | 235/175 |
| 4,399,517 A * | 8/1983 | Niehaus et al. ............ | 708/210 |
| 4,607,176 A | 8/1986 | Burrows et al. ........... | 307/449 |
| 5,095,457 A * | 3/1992 | Jeong ....................... | 708/626 |
| 5,175,862 A | 12/1992 | Phelps et al. .............. | 395/800 |
| 5,187,679 A * | 2/1993 | Vassiliadis et al. ........ | 708/706 |
| 5,325,320 A * | 6/1994 | Chiu ......................... | 708/629 |
| 5,343,417 A * | 8/1994 | Flora ......................... | 708/626 |
| 5,497,342 A | 3/1996 | Mou et al. ................. | 364/786 |
| 5,524,082 A | 6/1996 | Horstmann et al. ........ | 364/489 |
| 5,701,504 A | 12/1997 | Timko | |
| 5,964,827 A | 10/1999 | Ngo et al. .................. | 708/710 |
| 5,978,827 A | 11/1999 | Ichikawa ................... | 708/709 |
| 5,995,029 A | 11/1999 | Ryu ........................... | 341/101 |
| 6,023,566 A | 2/2000 | Belkhale et al. ........ | 395/500.03 |
| 6,175,852 B1 | 1/2001 | Dhong et al. | |
| 6,269,386 B1 | 7/2001 | Siers et al. | |
| 6,490,608 B1 * | 12/2002 | Zhu ........................... | 708/626 |
| 2002/0026465 A1 | 2/2002 | Rumynin et al. ........... | 708/210 |
| 2002/0078110 A1 | 6/2002 | Rumynin et al. ........... | 708/210 |
| 2004/0103135 A1 | 5/2004 | Talwar | |
| 2004/0153490 A1 | 8/2004 | Talwar et al. | |

FOREIGN PATENT DOCUMENTS

| | | | |
|---|---|---|---|
| EP | 0168650 | 1/1986 | ........... G06F/15/60 |
| EP | 0309292 | 3/1989 | ........... G06F/15/60 |
| EP | 0442356 | 8/1991 | |
| EP | 0741354 | 11/1996 | ............. G06F/7/60 |
| FR | 2475250 | 8/1981 | ............. G06F/7/38 |
| GB | 2016181 | 9/1979 | ............. G06F/7/39 |
| GB | 2062310 | 5/1981 | ............. G06F/7/52 |
| GB | 2263002 | 7/1993 | |
| GB | 2365636 | 2/2002 | ............. G06F/7/60 |
| GB | 2365637 | 2/2002 | ............. G06F/7/60 |
| WO | WO-99/22292 | 5/1999 | |
| WO | WO-02/12995 | 2/2002 | ............. G06F/7/00 |

OTHER PUBLICATIONS

Bedrij, O. J., "Carry–Select Adder", *IRE Trans., EC–11*, (Jun. 1962),340–346.

Knowles, S., "A Family of Adders", *Proc. 14th IEEE Symp. on Computer Arithmetic*, (1999),30–34.

Kogge, P. M., et al., "A Parallel Algorithm for the Efficient Solution of a General Class of Recurrence Equations", *IEEE Trans. Computers*, vol. C–22, No. 8, (Aug. 1973),786–793.

(Continued)

*Primary Examiner*—D. H Malzahn
(74) *Attorney, Agent, or Firm*—Schwegman, Lundberg, Woessner & Kluth, P.A.

(57) ABSTRACT

A parallel counter comprises logic for generating output bits as symmetrical functions of the input bits. The parallel counter can be used in a multiplication circuit. A multiplication circuit is also provided in which an array of combinatins of each bit of a binary number with each other bit of another binary number is generated having a reduced from in order to reduce the steps required in array reduction.

14 Claims, 18 Drawing Sheets

OTHER PUBLICATIONS

Figure 1:
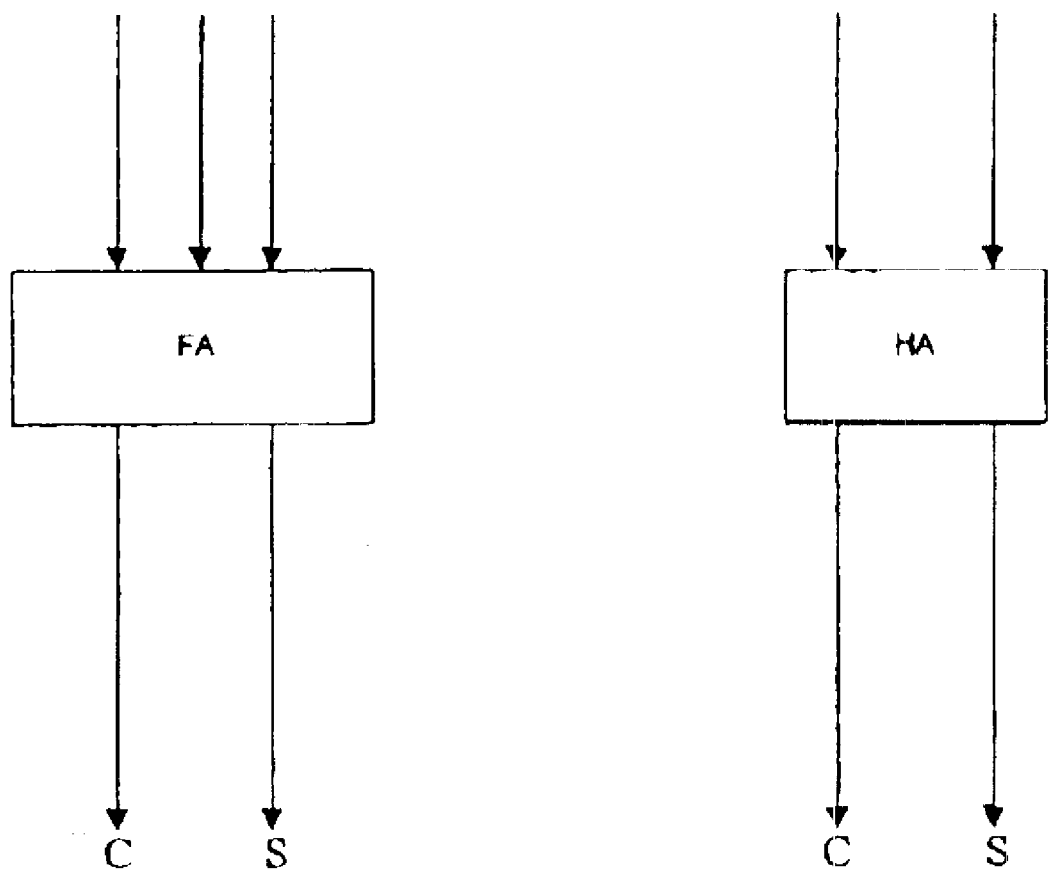

Ladner, Richard E., et al., "Parallel Prefix Computation", *Journal of ACM*, vol. 27, No. 4, (Oct. 1980),831–838.

Ling, Huey, "High–Speed Binary Adder", *IBM Journal of Research and Development*, vol. 25, No. 3, (1981),156–166.

Sklansky, J., "Conditional–Sum Addition Logic", *IRE Trans., EC–9*, (Jun. 1960),226–231.

Weinberger, A., et al., "A Logic for High–Speed Addition", *Nat. Bur. Stand. Circ., 591*, (1958),3–12.

Jones, R.F., et al., "Parallel Counter Implementation", *Conf. Rec. 26th Asilomar Conf. Signals, Systems & Computers*, vol. 1, ISBN 0–8186–3160–0, pp. 381–385, (1992).

Booth, A.D., "A Signed Binary Multiplication Technique", *Oxford University Press*, Reprinted from Q.J. Mech. Appl. Math. 4:236–240, pp. 100–104, (1951).

Dadda, L., "On Parallel Digital Multipliers", *Associazione Elettrontecnia ed Elettronica Italiana*, Reprinted from Alta Freq. 45:574–580, pp. 126132, (1976).

Dadda, L., "Some Schemes for Parallel Multipliers", *Assocciazione Elettrotenica ed Elettronica Italiana*, Reprinted from Alta Freq. 34:349–356, pp. 118–125, (1965).

Foster, C.C., et al., "Counting Responders in an Associative Memory", *The Institute of Electrical and Electronics Engineers, Inc.*, Reprinted, with permission, from IEEE Trans. Comput. C–20:1580–1583, pp. 86–89, (1971).

Swartzlander, Jr., E.E., "Parallel Counters", *IEEE Transactions on Computers* vol. C–22, No. 11 pp., 1021–1024 (1973).

Wallace, C.S., "A Suggestion for a Fast Multiplier", *The Institute of Electrical and Electronics Engineers, Inc.*, Reprinted, with permission, from IEEE Trans. Electron. Comput. EC–13:14–17, pp. 114–117, (1964).

Nicholson, J. O., "Parallel–Carry Adders Listing Two–Bit Covers", *IBM Technical Disclosure Bulletin, 22(11)*, (Apr., 1980),5036–5037.

Ong, S., et al., "A Comparison of ALU Structures for VLSI Technology", *Proceedings, 6th Symposium on Computer Arithmetic (IEEE)*, (1983), 10–16.

Schmookler, M. S., et al., "Group–Carry Generator", *IBM Technical Disclosure Bulletin, 6(1)*, (Jun., 1963),77–78.

Weinberger, A., "Extension of the Size of Group Carry Signals", *IBM Technical Disclosure Bulletin, 22(4)*, (Sep., 1979),1548–1550.

Weinberger, A., "Improved Carry–Look–Ahead", *IBM Technical Disclosure Bulletin, 21(6)*, (Nov., 1978),2460–2461.

Operations, *IBM Research Center, RC–289, Research Report*, (Jul. 18, 1960),22 pages.

Goto, et al., "A 54×54–b Regularly Structured Tree Multiplier", *IEEE Journal of Solid–State Circuits*, vol. 27, No. 9, (Sep. 1992), 1229–1236.

Hekstra, et al., "A Fast Parallel Multiplier Architecture", *IEEE International Symposium on Circuits and Systems; Institute of Electrical and Electronic Engineers, c1977–c1996, 20v. :ill. :28cm*, (1992),2128–2131.

Ho, I., et al., "Multiple Addition by Residue Threshold Functions and Their Representation By Array Logic", *The Institute of Electrical and Electronics Engineers, Inc., Reprinted with permission from IEEE Trans. Comput. C–22: 762–767*, (1973),pp. 80–85.

Nienhaus, H., "Efficient Multiplexer Realizations of Symmetric Functions", *IEEE*, (1981),pp. 522–525.

Oklobdzija, V G., et al., "Improving multiplier design by using improved column compression tree and optimized final adder in CMOS technology", *IEEE transactions on Very Large Scale Integration (VLSI) Systems*, IEEE, Inc, New York, vol. 3, No. 2,(1995),292–301.

Vassiliadis, S., et al., "7/2 Counters and Multiplication with Threshold Logic", *IEEE*, (1997),pp. 192–196.

Zuras, D, et al., "Balanced delay trees and combinatorial division in VLSI", *IEEE Journal of Solid State Circuits, SC–21*, IEEE Inc, New York, vol. SC–21, No. 5,(1986), 814–819.

Chakraborty, S., et al., "Synthesis of Symmetric Functions for Path–Delay Fault Testability", *12th International Conference on VLSI Design*, (1999),pp. 512–517.

Debnath, D., "Minimization of AND–OR–EXOR Three–Level Networks with AND Gate Sharing", *IEICE Trans. Inf. & Syst., E80–D, 10*, (1997),pp. 1001–1008.

Drechsler, R., et al., "Sympathy: Fast Exact Minimization of Fixed Polarity Reed–Muller Expressions for Symmetric Functions", *IEEE*, (1995),pp. 91–97.

Drechsler, R., et al., "Sympathy: Fast Exact Minimization of Fixed Polarity Reed–Muller Expressions for Symmetric Functions", *IEEE Transactions on Computer–Aided Design of Integrated Circuits and Systems, 16(1)*, (1997),pp. 1–5.

* cited by examiner

PRIOR ART

OR_3_1

OR_4_1

OR_5_1

PRIOR ART

PRIOR ART $A_7B_0$ $A_6B_0$ $A_5B_0$ $A_4B_0$ $A_3B_0$ $A_2B_0$ $A_1B_0$ $A_0B_0$
$A_7B_1$ $A_6B_1$ $A_5B_1$ $A_4B_1$ $A_3B_1$ $A_2B_1$ $A_1B_1$ $A_0B_1$
$A_7B_2$ $A_6B_2$ $A_5B_2$ $A_4B_2$ $A_3B_2$ $A_2B_2$ $A_1B_2$ $A_0B_2$
$A_7B_3$ $A_6B_3$ $A_5B_3$ $A_4B_3$ $A_3B_3$ $A_2B_3$ $A_1B_3$ $A_0B_3$
$A_7B_4$ $A_6B_4$ $A_5B_4$ $A_4B_4$ $A_3B_4$ $A_2B_4$ $A_1B_4$ $A_0B_4$
$A_7B_5$ $A_6B_5$ $A_5B_5$ $A_4B_5$ $A_3B_5$ $A_2B_5$ $A_1B_5$ $A_0B_5$
$A_7B_6$ $A_6B_6$ $A_5B_6$ $A_4B_6$ $A_3B_6$ $A_2B_6$ $A_1B_6$ $A_0B_6$
$A_7B_7$ $A_6B_7$ $A_5B_7$ $A_4B_7$ $A_3B_7$ $A_2B_7$ $A_1B_7$ $A_0B_7$

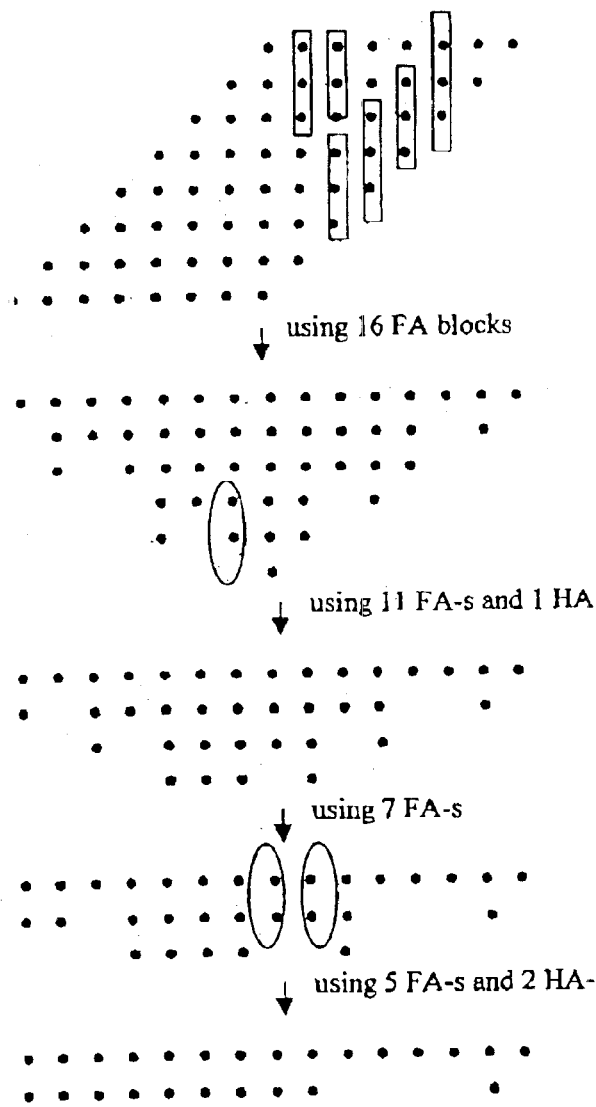

↓ using 16 FA blocks

↓ using 11 FA-s and 1 HA

↓ using 7 FA-s

↓ using 5 FA-s and 2 HA-s

Fig 15

PARALLEL COUNTER AND A MULTIPLICATION LOGIC CIRCUIT

The present invention generally relates to digital electronic devices and more particularly to a digital electronic device performing binary logic. In one aspect the present invention relates to a parallel counter and in another aspect the present invention relates to a multiplication logic circuit for multiplying two binary numbers.

It is instrumental for many applications to have a block that adds n inputs together. An output of this block is a binary representation of the number of high inputs. Such blocks, called parallel counters (L. Dadda, *Some Schemes for Parallel Multiplires, Alta Freq* 34: 349–356 (1965); E. E. Swartzlander Jr., *Parallel Counters*, IEEE Trans. Comput. C-22: 1021–1024 (1973)), are used in circuits performing binary multiplication. There are other applications of a parallel counter, for instance, majority-voting decoders or RSA encoders and decoders. It is important to have an implementation of a parallel counter that achieves a maximal speed. It is known to use parallel counters in multiplication (L. Dadda, *On Parallel Digital Multipliers, Alta Freq* 45: 574–580 (1976)).

A full adder is a special parallel counter with a three-bit input and a two-bit output. A current implemenation of higher parallel counters i.e. with a bigger number of inputs is based on using full adders (C. C. Foster and F. D. Stockton, *Counting Responders in an Associative Memory*, IEEE Trans. Comput. C-20: 1580–1583 (1971)). In general, the least significant bit of an output is the fastest bit to produce in such implementation while other bits are usually slower.

The following notation is used for logical operations:

⊕—Exclusive OR:

v—OR;

^—AND;

An efficient prior art design (Foster and Stockton) of a parallel counter uses full adders. A full adder, denoted FA, is a three-bit input parallel counter shown in FIG. 1. It has three inputs $X_1$, $X_2$, $X_3$, and two outputs S and C. Logical expressions for outputs are $S = X_1 \oplus X_2 \oplus X_3$, $C = (X_1 \char`\^ X_2) v (X_1 \char`\^ X_3) v (X_2 \char`\^ X_3)$ A half adder, denoted HA, is a two bit input parallel counter shown in FIG. 1. It has two inputs $X_1$, $X_2$ and two outputs S and C. Logical expressions for outputs are $S = X_1 \oplus X_2$, $C = X_1 \char`\^ X_2$, A prior art implemenation of a seven-bit input parallel counter illustrated in FIG. 2.

Multiplication is a fundamental operartion. Given two n-digit binary numbers $A_{n-1} 2^{n-1} + A_{n-2} 2^{n-2} + \ldots + A_1 2 + A_0$ and $B_{n-1} 2^{n-1} + B_{n-2} 2^{n-2} + \ldots + B_1 2 + B_0$, their product $P_{2n-1} 2^{2n-1} + P_{2n-2} 2^{2n-2} + \ldots + P_1 2 + P_0$ may have up to 2n digits. Logical circuits generating all $P_i$ as outputs generally follow the scheme in FIG. 14. Wallace has invented the first fast architecture for a multiplier, now called the Wallace-tree multiplier (Wallace, C. S., *A Suggestion for a Fast Multiplier*, IEEE Trans. Electron. Comput. EC-13: 14–17 (1964)). Dadda has investigated bit behaviour in a multiplier (L. Dadda, *Some Schemes for Parallel Multipliers*, Alta Freq 34: 349–356 (1965)). He has constructed a variety of multipliers and most multipliers follow Dadda's scheme.

Figure 14:
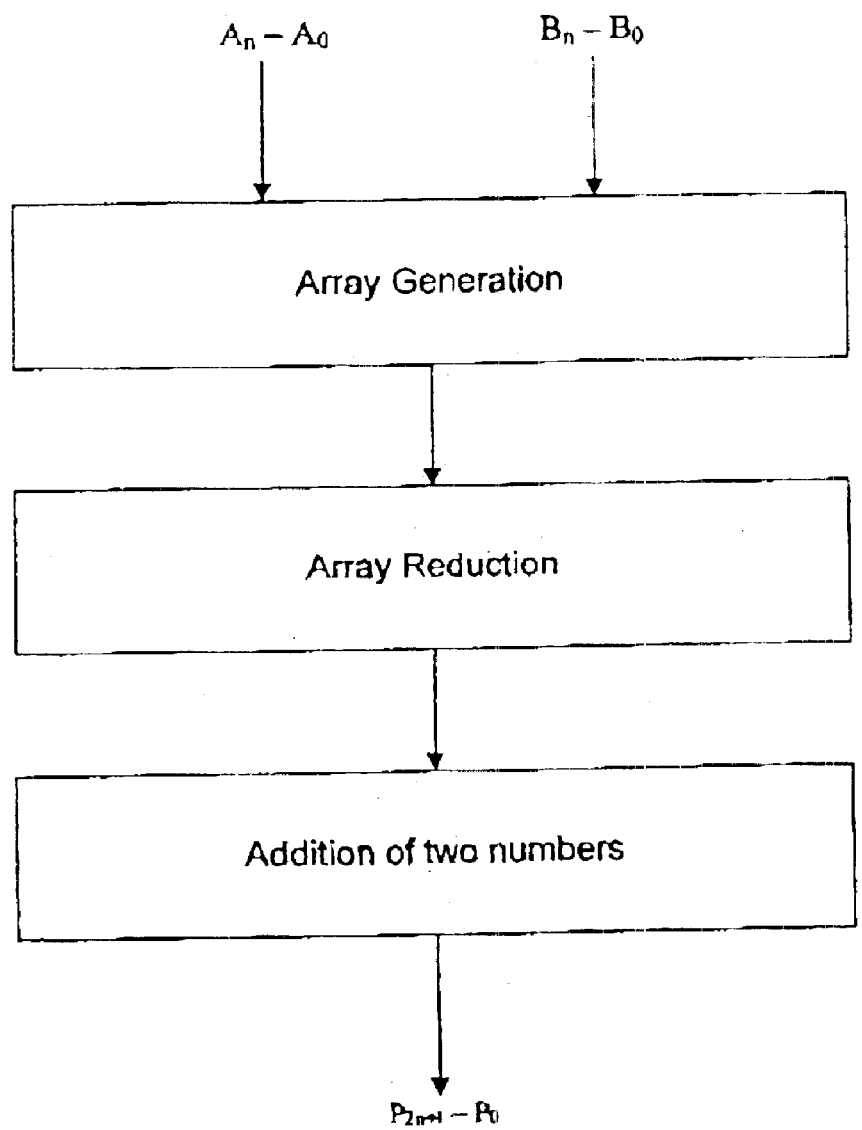

Dadda's multiplier uses the scheme shown in FIG. 14. If inputs have 8 bits then 64 parallel AND gates generate an array shown in FIG. 15. The AND gate sign ^ is omitted for clarity so that Ai^ Bj becomes AiBj. The rest of FIG. 15 illustrates array reduction that involves full adders (FA) and half adders (HA). Bits from the same column are added by half adders or full adders. Some groups of bits fed into a full adder are in rectangles. Some groups of bits fed into a half adder are in ovals. The result of array reduction is just two binary numbers to be added at the last step. One adds these two numbers by one of fast addition schemes, for instance, conditional adder or carry-look-ahead adder.

In accordance with the first aspect the present invention provides a parallel counter which is based on algebraic properties of symmetric functions. A plurality of binary output bits are generated as a symmetric function of a plurality of input bits.

The symmetric functions comprise logically AND combining sets of one or more binary inputs and logically OR or exclusive OR logic combining the logically combined sets of binary inputs to generate a binary output. The OR and the exclusive OR symmetric functions are elementary symmetric functions and the generated output binary bit depends only on the number of high inputs among the input binary bits. For the OR symmetric function, if the number of high inputs is m, the output is high if and only if $m \geq k$, where k is the size of the sets of binary inputs. Similarly, the generated output binary bit using the exclusive OR symmetric function is high if and only if $m \geq k$ and the number of subsets of inputs of the set of high inputs is an odd number. The size of the sets can be selected. The $i^{th}$ output bit can be generated using the symmetric function using exclusive OR logic by selecting the set sizes to be of size $2^i$, where i is an integer from 1 to N, N is the number of binary outputs, and i represents the significance of each binary output.

The sets of binary inputs used in the symmetric functions are each unique and they cover all possible combinations of binary inputs.

Thus in one embodiment of the present invention, each of the binary outputs can be generated using a symmetric function which uses exclusive OR logic. However, exclusive OR logic is not as fast as OR logic.

Thus in accordance with an embodiment of the present invetnion at least one of the binary outputs is gnerated as a symmetric function of the bineary inputs using OR logic for combining a variety of sets of one or more binary inputs. The logic is arranged to logically AND members of each set of binary inputs and logically OR the result of the AND operations.

Thus use of the symmetric function using OR logic is faster and can be used for generation of the most significant output bit. In such an embodiment the set size is set to be $2^{N-1}$, where N is the number of binary outputs and the $N^{th}$ binary output is the most significant.

It is also possible to use the symmetric function using OR logic for less significant bits on the basis of the output value of a more significant bit. In such a case, a plurality of possible binary outputs for a binary output less significant than the $N^{th}$ are generated as symmetric functions of the binary inputs using OR logic for combining a plurality of sets of one or more binary inputs, where N is the number of binary outputs. Selector logic is provided to select one of the possible binary outputs based on a more significant binary output value. The size of the sets used in such an arrangement for the $(N-1)^{th}$ bit is preferably $2^{N-1}+2^{n-2}$ and $2^{N-2}$ repsectively and one of the possible binary outputs is selected based on the $N^{th}$ binary output value.

In one embodiment of the present invention the circuit is designed in a modular form. A plurality of subcircuit logic modules are designed, each for generating intermediate binary outputs as a symmetric function of some of the binary inputs. Logic is also provided in this embodiment for logically combining the intermediate binary outputs to generate a binary outputs.

Since OR logic is faster, in a preferred embodiment the subcicuit logic modules implement the symmetric functions using OR logic. In one embodiment the subcircuit modules can be used for generating some binary outputs and one or more logic modules can be provided for generating other binary outputs in wich each logic module generates a binary output as a symmetric function of the binary inputs exclusive OR logic for combining a plurality of sets of one or more binary inputs.

Thus this aspect of the present invention provides a fast circuit that can be used in any architecture using parallel counters. The design is applicable to any type of technology from which the logic circuit is built.

The parallel counter in accordance with this aspect of the present invention is generally applicable and can be used in a multiplication circuit that is significantly faster than prior art implemenations.

In accordance with the second aspect of the present invention a technique for multiplying 2 N bit binary numbers comprises an array generation step in which an array of logical combinations between the bits of the two binary numbers is generated which is of reduced size compared to the prior art.

In accordance with this aspect of the present invention, a logic circuit for multiplying 2 N bit numbers comprises array generation logic for performing the logical AND operation between each bit in one binary bit and each bit in the other binary number to generate an array of logical AND combinations comprising an array of binary values, and for further logically combining logically adjacent values to reduce the maximum depth of the array to below N bits; array reduction logic for reducing the depth of the array to two binary numbers; and addition logic for adding the binary values of the two binary numbers.

When two binary numbers are multiplied together, as is conventional, each bit $A_i$ of the first binary number is logically AND combined with each bit $B_j$ of the second number to generate the array which comprises a sequence of binary numbers represented by the logical AND combinations, $A_i$ AND $B_j$. The further logical combinations are carried out by logically combining the combinations $A_1$ AND $B_{N-2}$, $A_1$ AND $B_{N-1}$, $A_0$ AND $B_{N-2}$, and $A_0$ AND $B_{N-1}$, where N is the number of bits in the binary numbers. In this way the size of the maximal column of numbers to be added together in the array is reduced.

More specifically the array generation logic is arranged to combine the combinations $A_1$ AND $B_{N-2}$ and $A_0$ AND $B_{n-1}$ using exclusive OR logic to replace these combinations and to combin $A_1$ AND $B_{n-1}$ and $A_0$ AND $B_{n-2}$ to replace the $A_1$ AND $B_{n-1}$ combination.

In one embodiment of the present inventoin the array reduction logic can include at least one of: at least one full adder, at least one half adder, and at least one parallel counter. The or each parallel counter can comprise the parallel counter in accordance with the first aspect of the present invention.

The second aspect of the present invention provides a reduction of the maximal column length in the array thereby reducing the number of steps required for array reduction. When the first aspect of the present invention is used in conjunction with the second aspect of the present invention, an even more efficient multiplication circuit is provided.

Figure 2:
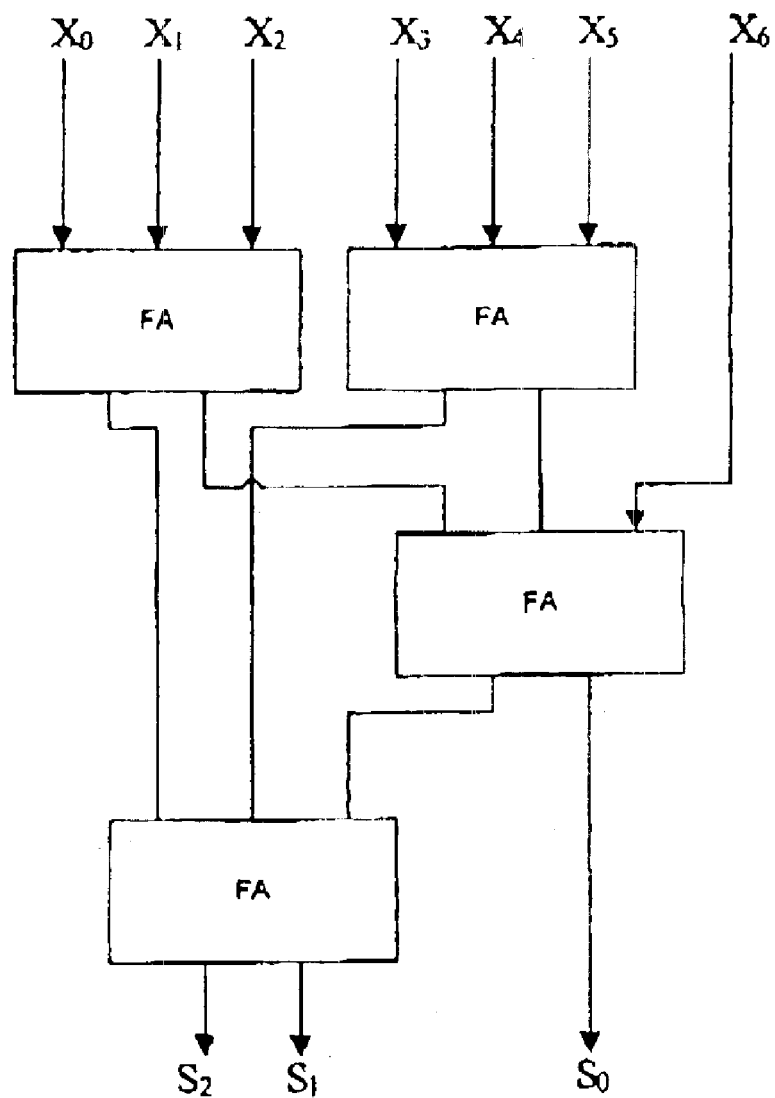
Figure 3:
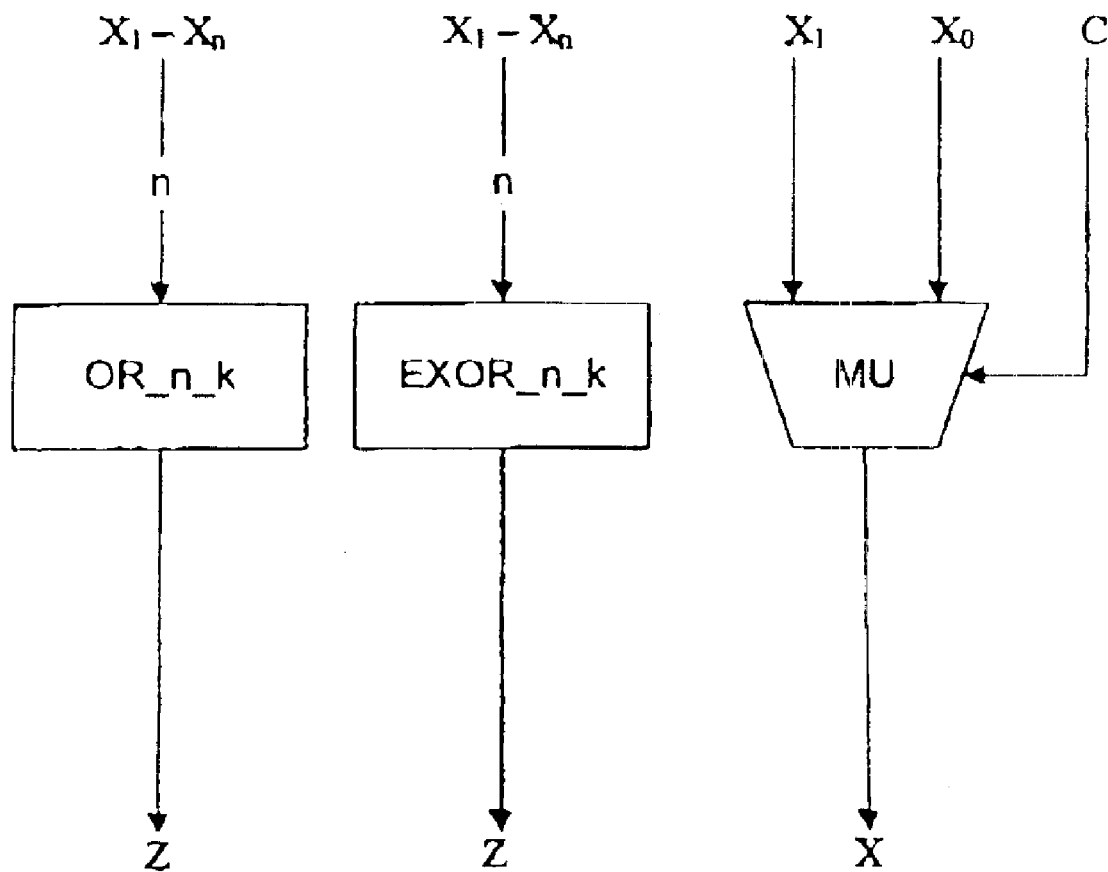
Figure 4:
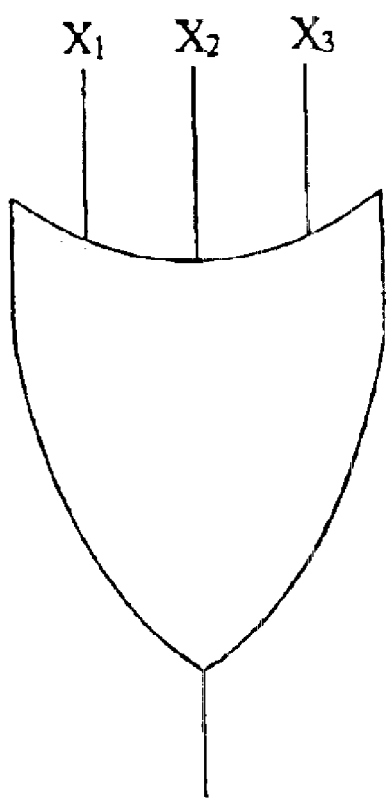
Figure 5:
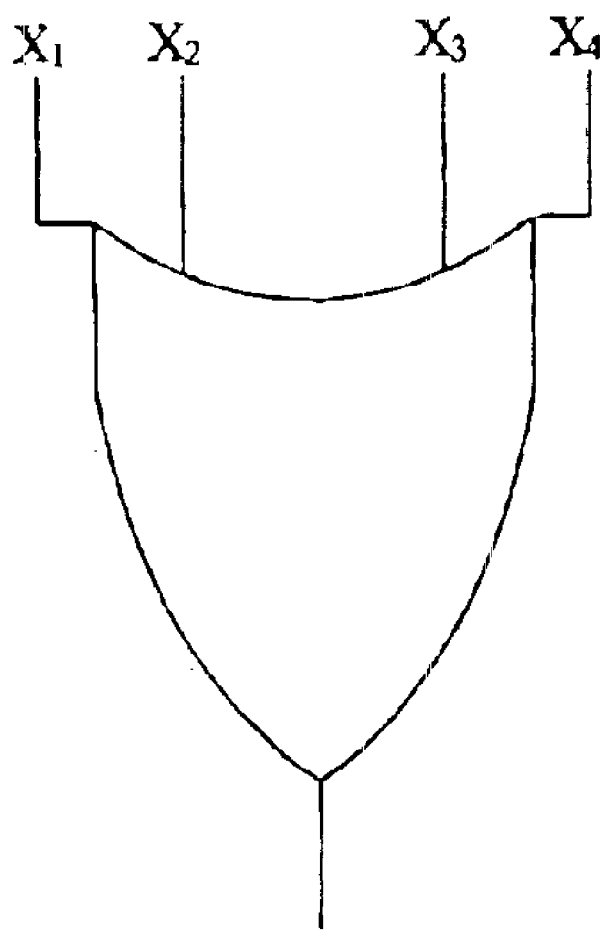
Figure 6:
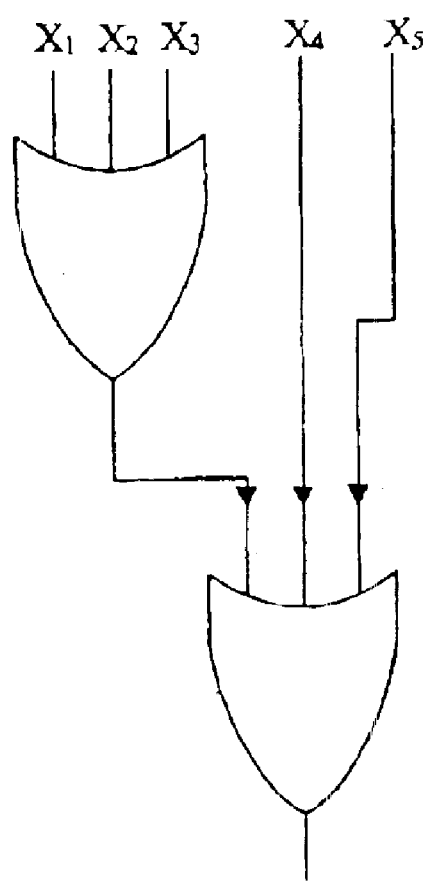
Figure 7:
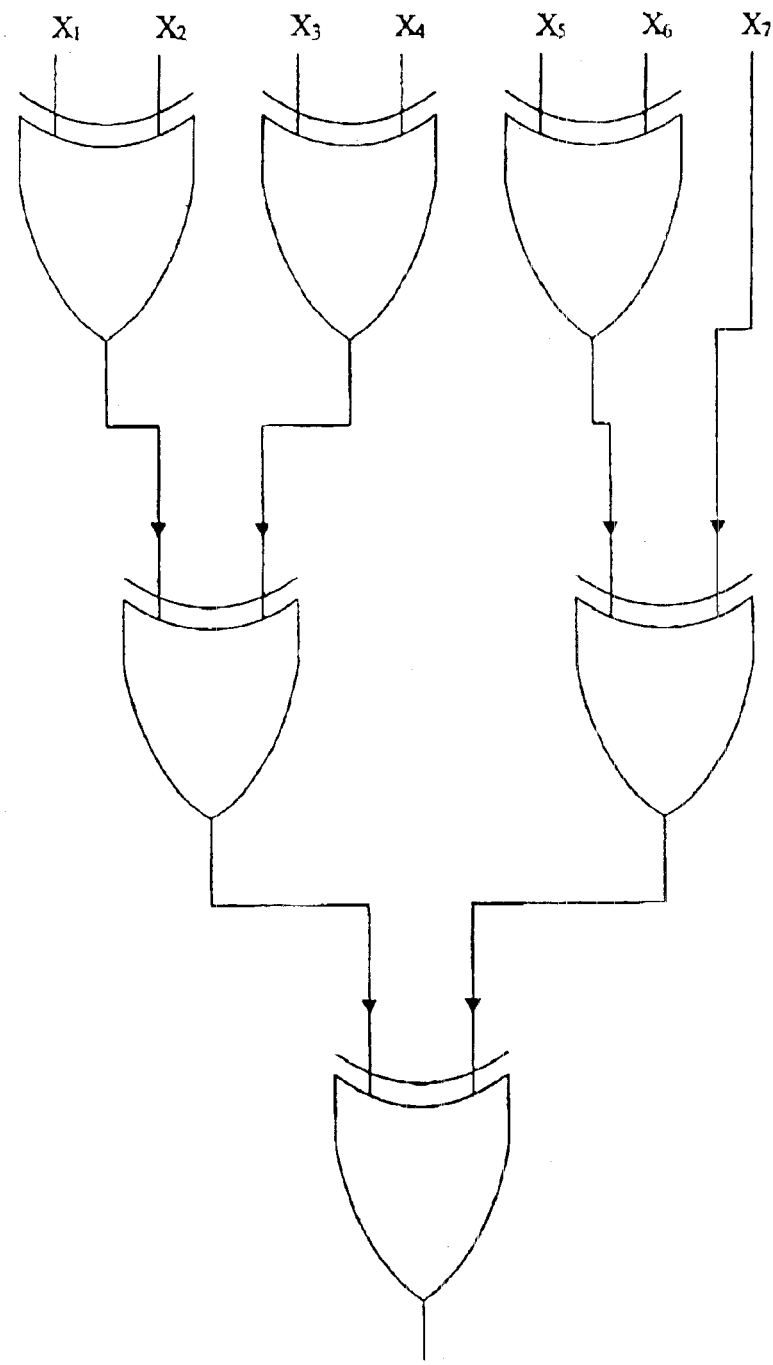
Figure 8:
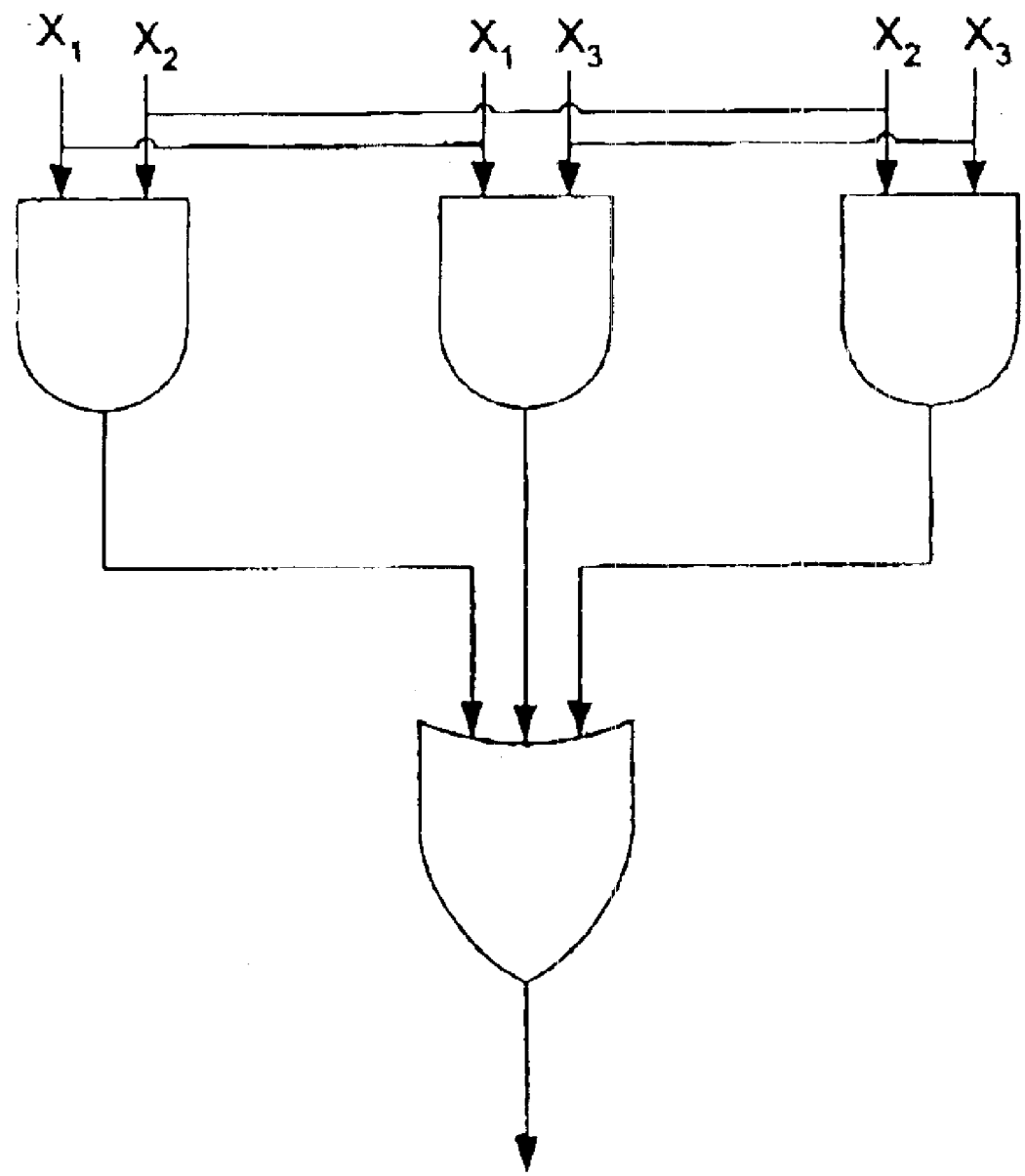
Figure 9:
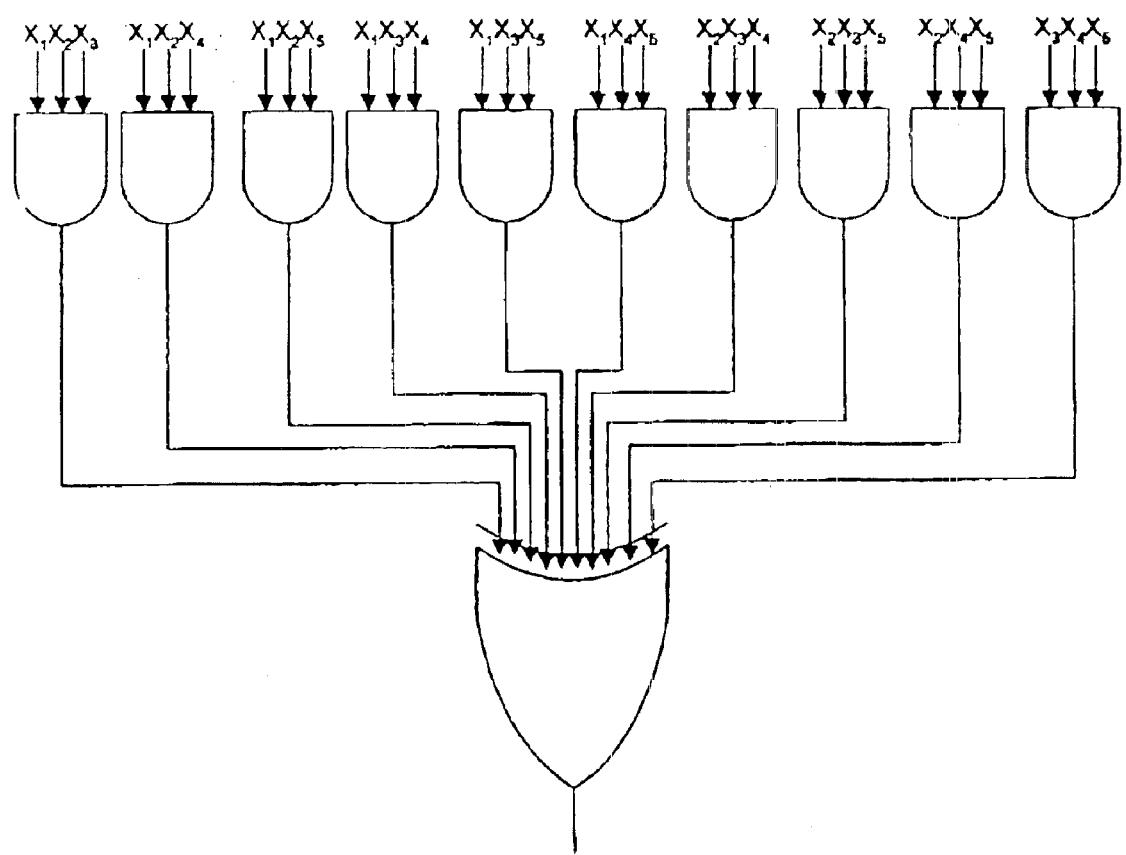
Figure 10:
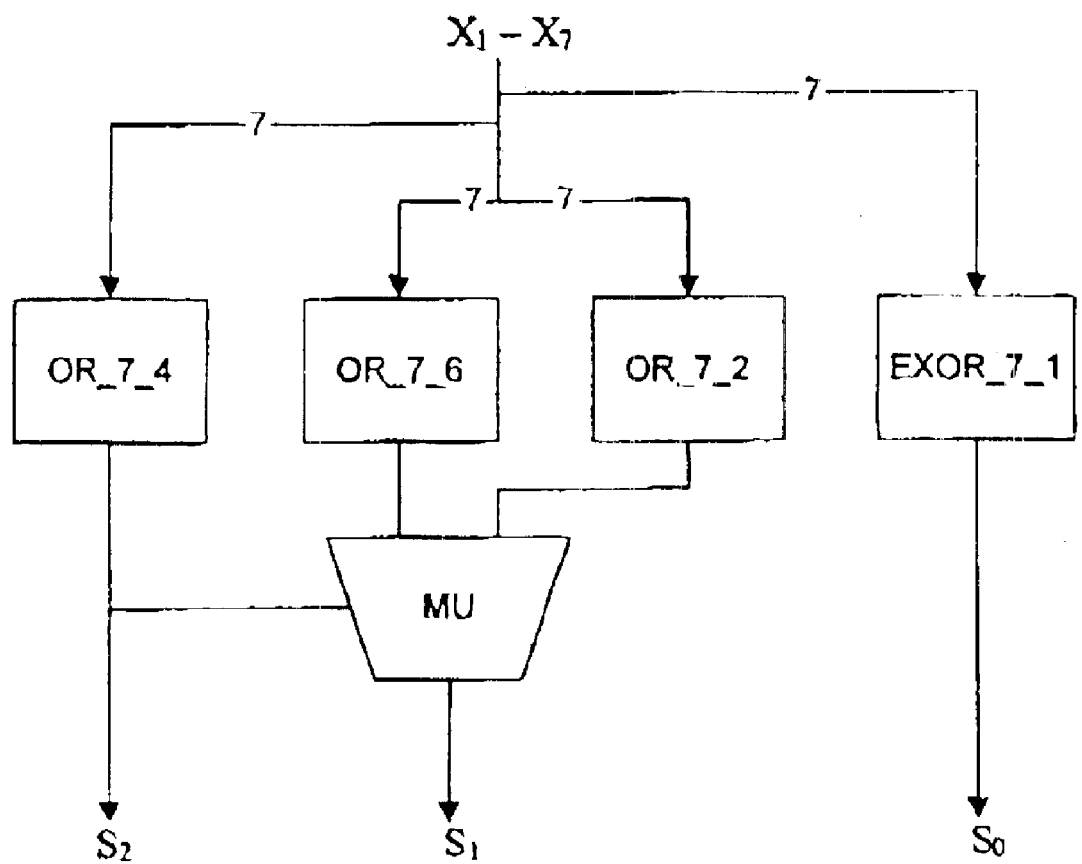
Figure 11:
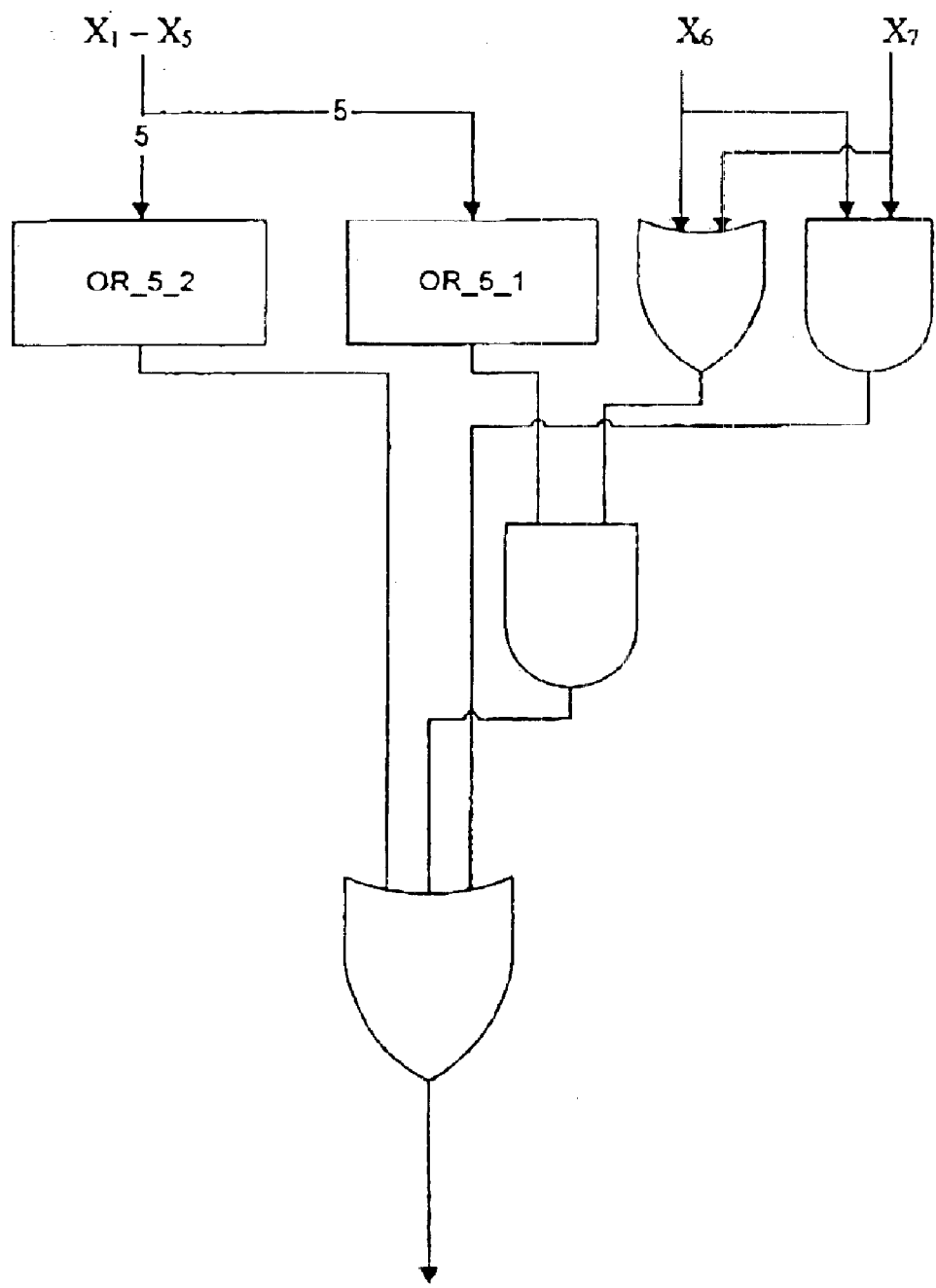
Figure 12:
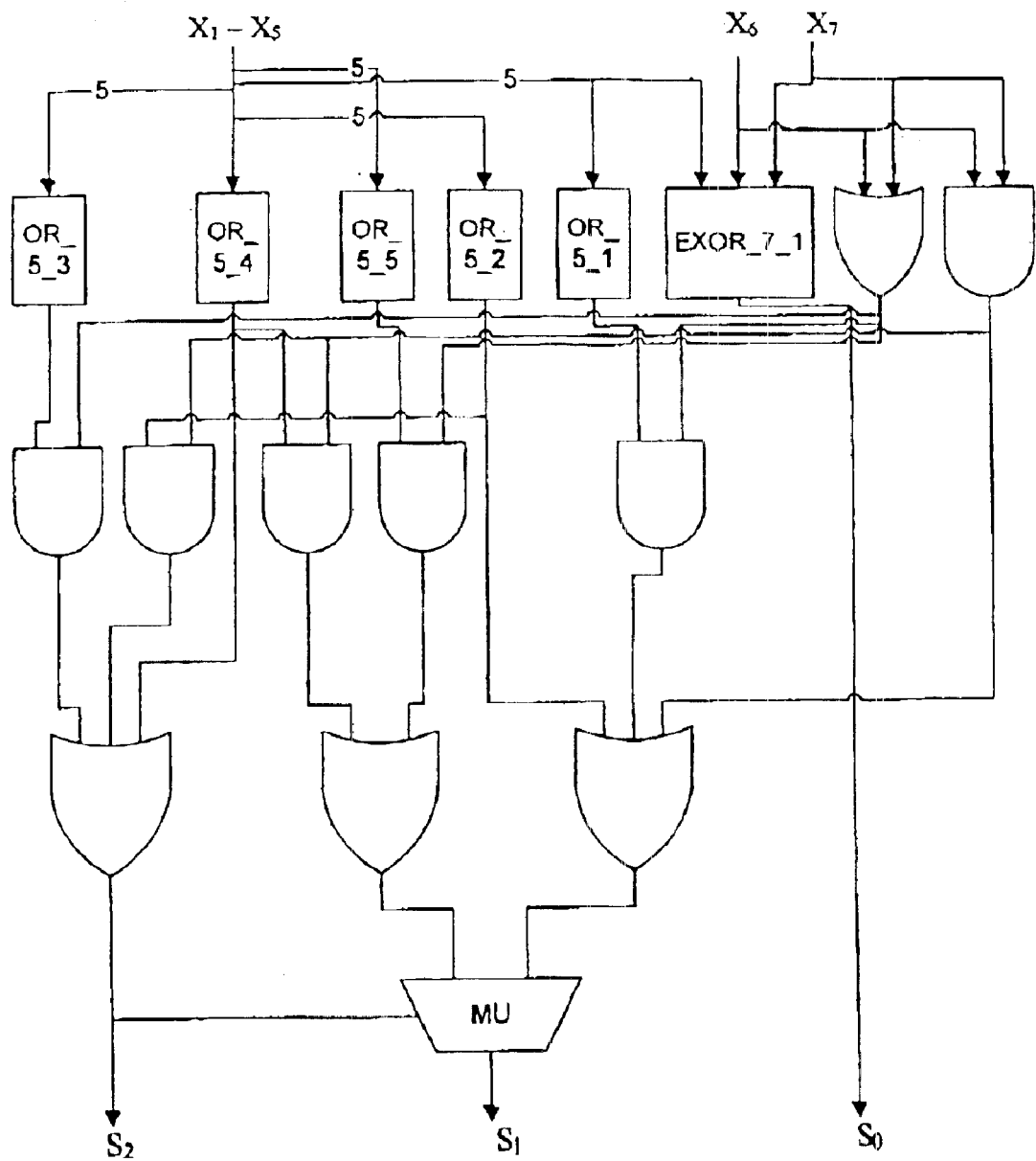
Figure 13:
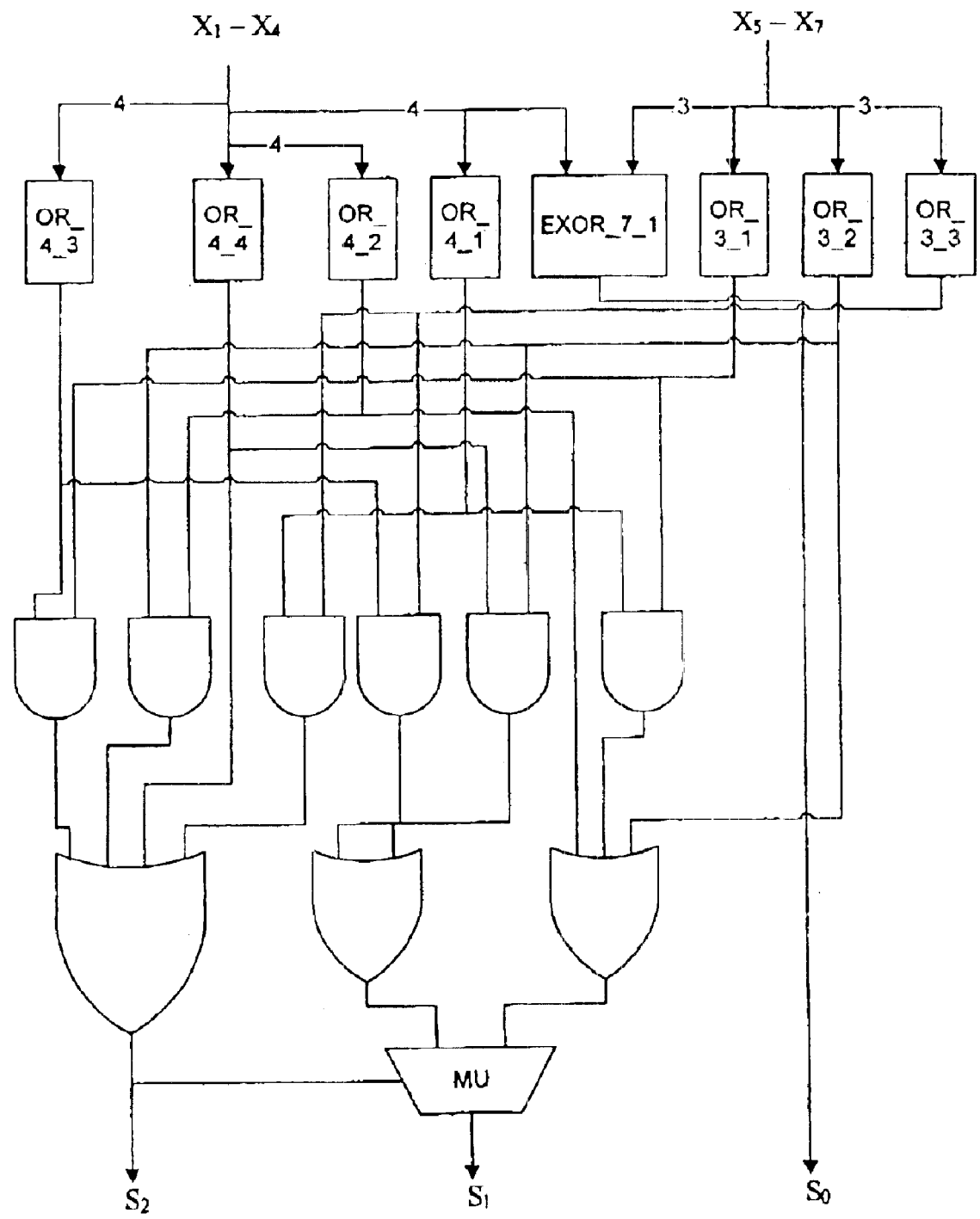
Figure 16:
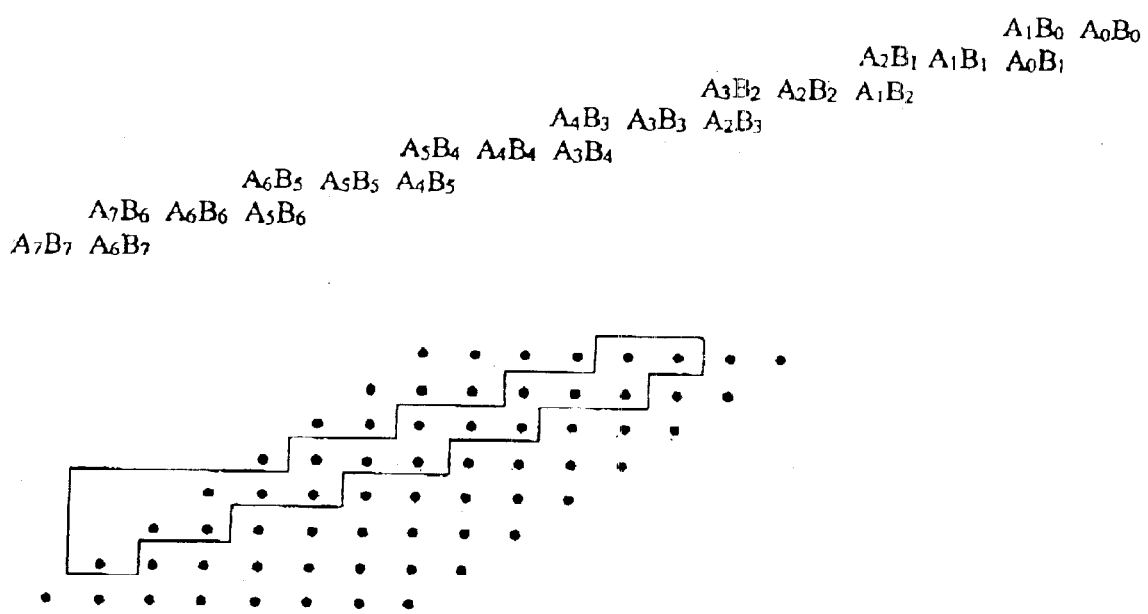
Figure 17:
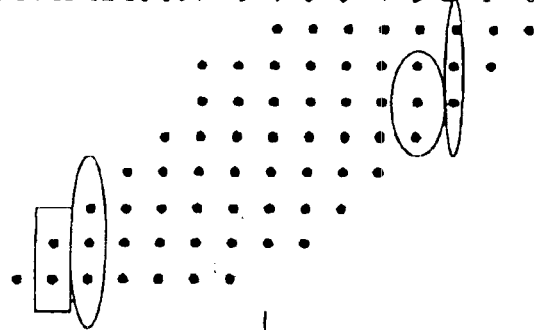
Figure 18:
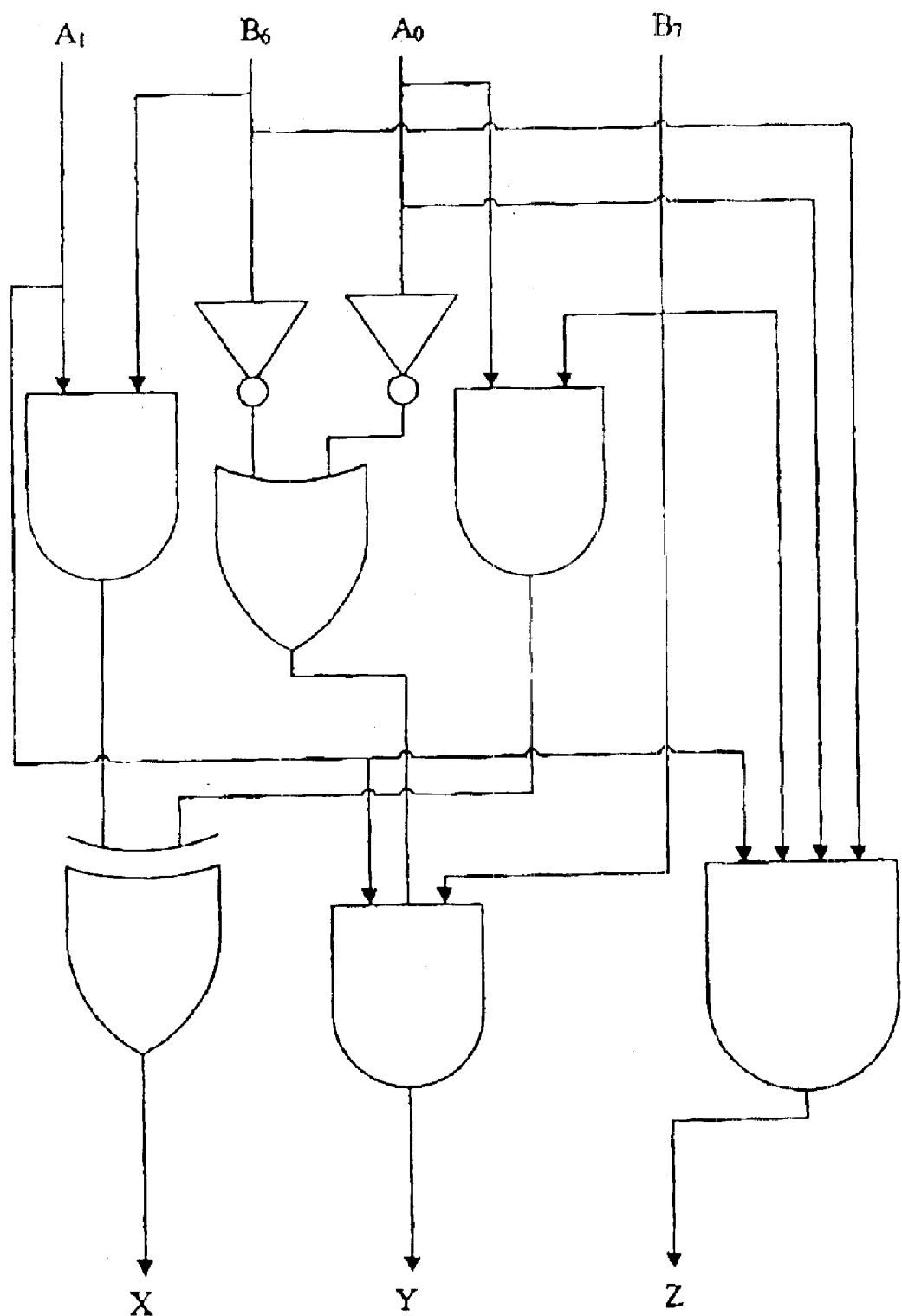

Embodiments of the present invention will now be described with reference to the accompanying drawings, in which:

FIG. 1 is a schematic diagram of a full adder and a half adder in accordance with the prior art, FIG. 2 is a schematic diagram of a parallel counter using full adders in accordance with the prior art, FIG. 3 is a schematic diagram illustrating the logic modules executing the symmetric functions for the generation of binary outputs and the multiplex (selector) used for selecting outputs, FIG. 4 is a diagram illustrating the logic for implementing the symmetric function OR_3_1, FIG. 5 is a diagram illustrating the logic for implementing the symmetric function OR_4_1, FIG. 6 is a diagram illustrating the logic for implementing the symmetric function OR_5_1 using 2 3 input OR gates, FIG. 7 is a diagram illustrating the logic for implementing the symmetric function EXOR_7_1 using two input exclusive OR gates, FIG. 8 is a diagram illustrating the logic for implementing the symmetric function OR_3_2, FIG. 9 is a diagram illustrating the logic for implementing the symmetric function EXOR_5_3, FIG. 10 is a diagram illustrating a parallel counter using the two types of symmetric functions and having seven inputs and three outputs, FIG. 11 is a diagram illustrating splitting of the symmetric function OR_7_2 into sub modules to allow the reusing of smaller logic blocks, FIG. 12 is a diagram of a parallel counter using the EXOR_7_1 symmetric function for the generation of the least significant output bit from all of the input bits, and smaller modules implementing symmetric functions using OR logic to generate the second and third output bits, FIG. 13 is a another diagram of a parallel counter similar to that of FIG. 12 accept that the partitioning of the inputs is chosen differently to use different functinal sub modules, FIG. 14 is a diagram of the steps used in the prior art for multiplication, FIG. 15 is a schematic diagram of the process of FIG. 14 in more detail, FIG. 16 is a diagram illustrating the properties of diagonal regions in the array, FIG. 17 is a diagram illustrating array deformation in accordance with the embodiment of the present invention and the subsequent steps of array reduction and adding, and FIG. 18 is a diagram of logic used in this embodiment for array generation.

The first aspect of the present invention will now be described.

The first aspect of the present invention relates to a parallel counter counting the number of high values in a binary number. The counter has i outputs and n inputs where i is determined as being the integer part of $\log_2$ n plus 1

A mathematical basis for the first aspect of the present invention is a theory of symmetric functions. We denote by $C_k^n$ the number of distinct k element subsets of a set of n elements. We consider two functions EXOR_n_k and OR_n_k of n variables $X_1, X_2, \ldots X_n$ given by $$\text{EXOR\_n\_k}(X_1, X_2, \ldots X_n) = \oplus(X_{i1}\hat{\ }X_{i2}\hat{\ } \ldots \hat{\ }X_{ik}),$$

$$\text{OR\_n\_k}(X_1, X_2, \ldots X_n) = V(X_{i1}\hat{\ }X_{i2}\hat{\ } \ldots \hat{\ }X_{ik})$$

where (i1, i2, ... ik) runs over all possible subsets of $\{X_1, X_2, \ldots X_n\}$ that contain precisely k elements. Blocks that produce such outputs are shown on FIG. 3.

The functions EXOR_n_k and OR_n_k are elementary symmetric functions. Their values depend only on the number of high inputs among $X_1, X_2, X_3, \ldots X_n$. More precisely, if m is the number of high inputs among $X_1, X_2, X_3, \ldots X_n$ then OR_n_k$(X_1, X_2, \ldots X_n)$ is high if and only if $m \geq k$. Similarly, EXOR_n_k$(X_1, X_2, \ldots X_n)$ is high if and only if $m \geq k$ and $C_k^m$ is odd.

Although EXOR_n_k and OR_n_k look similar, OR_n_k is much faster to produce since EXO-gates are slower than OR-gates.

In the above representation n is the number of inputs and k is the size of the subset of inputs selected. Each set of k inputs is a unique set and the subsets comprise all possible subsets of the set of inputs. For example, the symmetric function OR_3_1 has three inputs $X_1, X_2$ and $X_3$ and the set size is 1. Thus the sets comprise $X_1, X_2$ and $X_3$. Each of these sets is then logically OR combined to generated the binary output. The logic for performing this function is illustrated in FIG. 4.

FIG. 5 illustrates the logic for performing the symmetric OR_4_1.

When the number of inputs become large, it may not be possible to use simple logic.

FIG. 6 illustrates the use of two OR gates for implementing the symmetric function OR_5_1.

FIG. 7 similarly illustrates the logic for performing EXOR_7_1. The sets comprise the inputs $X_1, X_2, X_3, X_4, X_5, X_6$, and $X_7$. These inputs are input into three levels of exclusive OR gates.

When k is greater than 1, the inputs in a subset must be logically AND combined. FIG. 8 illustrates logic for performing the symmetric function OR_3_2. The inputs $X_1$ and $X_2$ comprise the first set and are input to a first AND gate. The inputs $X_1$ and $X_3$ constitute a second set and are input to a second AND gate. The inputs $X_2$ and $X_3$ constitute a third set and are input to a third AND gate. The output of the AND gates are input to an OR gate to generate the output function.

FIG. 9 is a diagram illustrating the logic for performing the symmetric function EXOR_5_3. To perform this function the subsets of size 3 for the set of five inputs comprise ten sets and ten AND gates are required. The output of the AND gates are input to an exclusive OR gate to generate the function.

The specific logic to implement the symmetric functions will be technology dependent. Thus the logic can be designed in accordance with the technology to be used.

In accordance with a first embodiment of the present invention the parallel counter of each output is generated using a symmetric function using exclusive OR logic.

Let the parallel counter have n inputs $X_1, \ldots X_n$ and l+1 and $S_t, S_{t-1}, \ldots S_0$. $S_0$ is the least significant bit and $S_t$ is the most significant bit. For all i from 0 to t, $$S_i = \text{EXOR\_n\_2}^i(X_1, X_2, \ldots X_n).$$

It can thus be seen that for a seven bit input i.e. n=7, i will have values of 0, 1 and 2. Thus to generate the output $S_0$ the function will be EXOR_7_1, to generate the output $S_1$ the function will be EXOR_7_2 and to generate the output $S_2$ the function will be EXOR_7_4. Thus for the least significant bit the set size (k) is 1, for the second bit the set size is 2 and for the most significant bit the set size is 4. Clearly the logic required for the more significant bits becomes more complex and thus slower to implement.

Thus in accordance with a second embodiment of the present invention, the most significant output bit is generated using a symmetric function using OR logic.

This is more practical since OR_n_k functions are faster than EXOR_n_k functions. For the most significant output bit $$S_k = \text{OR\_n\_2}^t(X_1, X_2, \ldots X_n).$$

In particular, with a seven-bit input $$S_2 = \text{OR\_7\_4}(X_1, X_2, X_3, X_4, X_5, X_6, X_7).$$

Thus in this second embodiment of the present invention the most significant bit is generated using symmetric functions using OR logic whereas the other bits are generated using symmetric functions which use exclusive OR logic.

A third embodiment will now be described in which intermediate bits are generated using symmetric functions using OR logic.

An arbitrary output bit can be expressed using OR_n_k functions if one knows bits that are more significant. For instance, the second most significant bit is given by $$S_{t-1} = (S_t\hat{\ }\text{OR\_n\_2}^t + 2^{t-1})v((-S_t)\hat{\ }\text{OR\_n\_2}^{t-1}).$$

In particular, with a seven-bit input $$S_1 = (S_2\hat{\ }\text{OR\_7\_6}(X_1, X_2, X_3, X_4, X_5, X_6, X_7))v$$

$$((-S_2)\hat{\ }\text{OR\_7\_2}(X_1, X_2, X_3, X_4, X_5, X_6, X_7)).$$

A further reduction is $$S_1 = \text{OR\_7\_6}(X_1, X_2, X_3, X_4, X_5, X_6, X_7))v$$

$$((-S_2)\hat{\ }\text{OR\_7\_2}(X_1, X_2, X_3, X_4, X_5, X_6, X_7)).$$

A multiplexer MU, shown in FIG. 3, implements this logic. It has two inputs $X_0, X_1$, a control C, and an output Z determined by the formula $$Z = (C\hat{\ }X_1)v((-C)\hat{\ }X_0).$$

It is not practical to use either EXOR_n_k functions or OR_n_k functions exclusively. It is optimal to use OR_n_k functions for a few most significant bits and EXOR_n_k functions for the remaining bits. The fastest, in TSMC.25, parallel counter with 7 inputs is shown in FIG. 10.

Future technologies that have fast OR_15_8 blocks would allow building a parallel counter with 15 inputs. A formula for the third significant bit using OR_n_m functions is thus:

$$S_{t-2} = (S_t\hat{\ }S_{t-1}\hat{\ }\text{OR\_n\_2}^t + 2^{t-1} + 2^{t-2})v(S_t\hat{\ }(-S_{t-1})\hat{\ }\text{OR\_n\_2}^t + 2^{t-2})v$$

$$((-S_t)\hat{\ }S_{t-1}\hat{\ }\text{OR\_n\_2}^{t-1} + 2^{t-2})v((-S_t)\hat{\ }(-S_{t-1})\hat{\ }\text{OR\_n\_2}^{t-2}).$$

A fourth embodiment of the present invention will now be described which divides the logic block implementing the symmetric function into small blocks which can be reused.

An implementation of OR_7_2 is shown in FIG. 11. The 7 inputs are split into two groups: five inputs from $X_1$ to $X_5$ and two remaining inputs $X_6$ and $X_7$. Then the following identity is a basis for the implementation in FIG. 11.

$$OR\_7\_2(X_1, \ldots, X_7) = OR\_5\_2(X_1, \ldots, X_5)v$$

$$(OR\_5\_1(X_1, \ldots X_5)\hat{\ }OR\_2\_1(X_6, X_7))v\ OR\_2\_2(X_6, X_7)$$

One can write similar formulas for OR_7_4 and OR_7_6. Indeed, $$OR\_7\_4(X_1, \ldots, X_7) = OR\_5\_4(X_1, \ldots, X_5)v$$

$$(OR\_5\_3(X_1, \ldots X_5)\hat{\ }OR\_2\_1(X_6, X_7))v$$

$$(OR\_5\_2(X_1, \ldots, X_5)\hat{\ }OR\_2\_2(X_6, X_7)),$$

$$OR\_7\_6(X_1, \ldots X_7) =$$

$$(OR\_5\_5(X_1, \ldots X_5)\hat{\ }OR\_2\_1(X_6, X_7))v$$

$$(OR\_5\_4(X_1, \ldots X_5)\hat{\ }OR\_2\_2(X_6, X_7)).$$

Thus, it is advantageous to split variables and reuse smaller OR_n_k functions in a parallel counter. For instance, an implemenation of a parallel counter based on partitioning seven inputs into groups of two and five is in FIG. 12.

Similarly, one can partition seven inputs into groups of four and three. An implementation of the parallel counter based on this partition is in FIG. 13. One uses the following logic formulas in this implementation.

$$OR\_7\_2(X_1, \ldots, X_7) = OR\_4\_2(X_1, X_2, X_3, X_4)v$$

$$OR\_4\_1(X_1, X_2, X_3, X_4)\hat{\ }OR\_3\_1(X_5, X_6, X_7))v\ OR\_3\_2(X_5, X_6, X_7),$$

$$OR\_7\_4(X_1, \ldots, X_7) = OR\_4\_4(X_1, X_2, X_3, X_4)v$$

$$(OR\_4\_3(X_1, X_2, X_3, X_4)\hat{\ }OR\_3\_1(X_5, X_6, X_7))v$$

$$(OR\_4\_2(X_1, X_2, X_3, X_4)\hat{\ }OR\_3\_2(X_5, X_6, X_7))v$$

$$(OR\_4\_1(X_1, X_2, X_3, X_4)\hat{\ }OR\_3\_3(X_5, X_6, X_7)),$$

$$OR\_7\_6(X_1, \ldots, X_7) =$$

$$(OR\_4\_4(X_1, X_2, X_3, X_4)\hat{\ }OR\_3\_2(X_5, X_6, X_7))v$$

$$(OR\_4\_3(X_1, X_2, X_3, X_4)\hat{\ }OR\_3\_3(X_5, X_6, X_7)).$$

One needs a method to choose between the implementations in FIGS. 12 and 13. Here is a pneumonic rule for making a choice. If one or two inputs arrive essentially later then one should use the implemenation on FIG. 12 based on partition 7=5+2. Otherwise, the implementation on FIG. 13 based on partition 7=4+3 is probably optimal.

Parallel counters with 6, 5, and 4 inputs can be implemented according to the logic for the seven input parallel counter. Reducing the number of inputs decreases the area significantly and increases the speed slightly. It is advantageous to implement a six input parallel counter using partitions of 6, 3+3 or 4+2.

A second aspect of the present invention comprises a technique for multiplication and this will be described hereinafter.

Multiplication is a fundamental operation in digital circuits. Given two n-digit binary numbers $$A_{n-1}2^{n-1} + A_{n-2}2^{n-2} + \ldots + A_1 2 + A_0$$

and $$B_{n-1}2^{n-1} + B_{n-2}2^{n-2} + \ldots + B_1 2 + B_0,$$

there product $$P_{2n-1}2^{2n-1} + P_{2n-2}2^{2n-2} + \ldots + P_1 2 + P_0$$

has up to 2n digits. Logical circuits generating all $P_1$ as outputs generally follow the scheme in FIG. 14. Wallace has invented the first fast architecture for a multiplier, now called the Wallace-tree multiplier (Wallace, C. S., *A Suggestion for a Fast Multiplier*, IEEE Trans. Electron, Comput. EC-13: 14–17 (1964)). Dadda has investigated bit behaviour in a multiplier (L. Dadda, *Some Schemes for Parallel Multipliers*, Alta Freq 34: 349–356 (1965)). He has constructed a variety of multipliers and most multipliers follow Dadda's scheme.

Dadda's multiplier uses the scheme in on FIG. 14. If inputs have 8 bits then 64 parallel AND gates generate an array shown in FIG. 15. The AND gate sign ^ is omitted for clarity so that $A_i\hat{\ }B_j$ becomes $A_iB_j$. The rest of FIG. 15 illustrates array reduction that involves full adders (FA) and half adders (HA). Bits from the same column are added by half adders or full adders. Some groups of bits fed into a full adder are in rectangles. Some groups of bits fed into a half adder are in ovals. The result of array reduction is just two binary numbers to be added at the last step. One adds these two numbers by one of fast addition schemes, for instance, conditional adder or carry-look-ahead adder.

This aspect of the present invention comprises two preferred steps: array deformation and array reduction using the parallel counter with the accordance with the first aspect of the present invention.

The process of array deformation will now be described.

Some parts of the multiplication array, formed by $A_iB_j$ such as on FIG. 15, have interesting properties. One can write simple formulas for the sum of the bits in these parts. Examples of such special parts are on FIG. 16. In general, chose an integer k, and those $A_iB_j$ in the array such that the absolute value of i-j-k is less or equal to 1 comprise a special part.

Let $S_i$ be the bits of the sum of all the bits of the form $A_iB_j$ shown in FIG. 1. Then $$S_0 = A_0\hat{\ }B_0,$$

$$S_1 = (A_1\hat{\ }B_0) \oplus (A_0\hat{\ }B_1),$$

$$S_2 = (A_1\hat{\ }B_1) \oplus (A_1\hat{\ }B_1\hat{\ }A_0\hat{\ }B_0),$$

$$S_{2k+1} = (A_{K+1}\hat{\ }B_k) \oplus (A_k\hat{\ }B_{k+1}) \oplus (A_k\hat{\ }B_k\hat{\ }A_{k-1}\hat{\ }B_{k-1})$$

for all k>0, $$S_{2k} = (A_k\hat{\ }B_k) \oplus (A_{k-1}\hat{\ }B_{k-1}\hat{\ }$$

$$((A_{k+1}\hat{\ }B_{k+1})v(A_{k-1}\hat{\ }B_{k-1}\hat{\ }(A_{k+1}\ v\ B_{k+1})))$$

for all k>1.

These formulas show that the logic for summing the chosen entries in the array does not get large. Whereas if random numbers were summed the logic for the $(n+1)^{th}$ bits is larger than the logic for the $n^{th}$ bit.

Using these formulas, one can generate a different array. The shape of array changes. This is why it is called array deformation. These formulas are important because one can speed up a multiplication circuit by generating an array of a particular shape.

The array in FIG. 17 is for an 8- bit multiplication. The AND gate sign ^ is omitted for clarity so that $A_i{}^{\wedge}B_j$ becomes $A_iB_j$. Array deformation logic generates X, Y, and Z:

$$X=(A_1{}^{\wedge}B_6)\oplus(A_0{}^{\wedge}B_7),$$

$$Y=A_1{}^{\wedge}B_7{}^{\wedge}\text{-}(A_0{}^{\wedge}B_6),$$

$$Z=A_1{}^{\wedge}B_7{}^{\wedge}A_0{}^{\wedge}B_6.$$

The advantage of this array over one in FIG. 15 is that the maximal number of bits in a column is smaller. The array in FIG. 15 has a column with 8 bits. The array on FIG. 17 has 4 columns with 7 bits but non with 8 or more bits. The logic for the generation of X Y and Z is illustrated on FIG. 18. This logic can be used in parallel with the first two full adders (illustrated in FIG. 2) in the array reduction step thus avoiding delays caused by additional logic.

Array reduction is illustrated in FIG. 17. The first step utilizes 1 half adder, 3 full adders, 1 parallel counter with 4 inputs, 2 parallel counters with 5 inputs, 1 parallel counter with 6 inputs, and 4 parallel counters with 7 inputs. The three parallel counters (in columns 7, 8, and 9) have an implemenation based on 7=5+2 partition. The bits X, Y, and Z join the group of two in the partition. The counter in column 6 is implemented on 7=4+3 partition. The counter in column 5 is based on 6=3+3 partition. The remaining counters should not be partitioned. The locations of full adders are indicated by ovals. The half adders is shown by a rectangle.

An adder for adding the final two binary numbers is designed based on arrival time of bits in two numbers. This gives a slight advantage but it is based on common knowledge, that is conditional adder and ripple-carry adder.

Although in this embodiment the multiplication of two 8 bit numbers has been illustrated, the invention is applicable to any N bit binary number multiplication. For example for 16 bit multiplication, the array reduction will reduce the middle column height from 16 to 15 thus allowing two seven bit full adders to be used for the first layer to generate two 3 bit outputs and the left over input can be used with the other two 3 outputs as an input to a further seven input full adder thus allowing the addition of the 16 bits in only two layers.

The second aspect of the present invention can be used with the parallel counter of the first aspect of the present invention to provide a fast circuit.

The final counter of the first aspect of the present invention has other applications, other than used in the multiplier of the second aspect of the present invention. It can be used in RSA and reduced area multipliers. Sometimes, it is practical to build just a fragment of the multiplier. This can happen when the array is too large, for instance in RSA algorithms where multiplicands may have more than more than 1000 bits. This fragment of a multiplier is then used repeatedly to reduce the array. In current implementations, it consists of a collection of full adders. One can use 7 input parallel counters followed by full adders instead.

A parallel counter can also be used in circuits for error correction codes. One can use a parallel counter to produce Hamming distance. This distance is useful in digital communication. In particular the Hamming distance has to be computed in certain types of decoders, for instance, the Viterbi decoder or majority-logic decoder.

Given two binary messages $(A_1, A_2, \ldots A_n)$ and $(B_1, B_2, \ldots B_n)$, the Hamming distance between them is the number of indices i between 1 and n such that $A_i$ and $B_j$ are different. This distance can be computer by a parallel counter whose n inputs are $$(A_1 \oplus B_1, A_2 \oplus B_2, \ldots A_n \oplus B_n).$$

The multiply-and-add operation is fundamental in digital electronics because it includes filtering. Given 2n binary numbers $X_1, X_2, \ldots X_n, Y_j, Y_2, \ldots Y_n$, the result of this operation is $$X_1Y_1+X_2Y_2+ \ldots +X_nY_n.$$

One can use the multiplier described to implement multiply-and-add in hardware. Another strategy can be to use the scheme in FIG. 14. All partial products in products $X_iY_i$ generate an array. Then one uses the parallel counter X to reduce the array.

In the present invention, one can use the parallel counter whenever there is a need to add an array of numbers. For instance, multiplying negative number in two-complement form, one generates a different array by either Booth recording (A. D. Booth, *A Signed Binary Multiplication Technique*, Q. J. Mech. Appl. Math. 4:236–240 (1951)) or another method. To obtain a product one addes this array of numbers.

What is claimed is:

1. A parallel counter comprising:
   at least five inputs for receiving a plurality of binary inputs, wherein m represents the number of high binary inputs;
   at least three outputs for outputting binary outputs indicating the number of binary ones in the plurality of binary inputs; and
   a logic circuit connected between the plurality of inputs and the plurality of outputs and for generating at least three of the binary outputs as elementary OR or EXOR symmetric functions of the binary inputs, wherein said elementary OR symmetric function is generated by elementary OR symmetric function logic comprising at least one of:
   (i) the OR logic combination of the binary inputs and is high if and only if $m \geq 1$,
   (ii) the AND logic combination of sets of the binary inputs and the OR logic combination of the AND logic combinations and is high if and only if $m \geq k$, where k is the size of the sets of binary inputs, each set being unique and the sets covering all possible combinations of binary inputs, or
   (iii) the AND logic combination of the binary inputs and is high if and only if all said binary inputs are high; and said elementary EXOR symmetric function is generated by elementary EXOR symmetric function logic comprising at least one of:
   (i) the EXOR logic combination of the binary inputs and is high if and only if $m \geq 1$,
   (ii) the AND logic combination of sets of the binary inputs and the EXOR logic combination of the AND logic combinations and is high if and only if $m \geq k$ and the number of sets of high inputs is an odd number, where k is the size of the sets of binary inputs, each set being unique and the sets covering all possible combinations of binary inputs, or
   (iii) the AND logic combination of the binary inputs and is high if and only if all said binary inputs are high.

2. A parallel counter according to claim 1 wherein said logic circuit comprises said elementary EXOR symmetric function logic to generate at least one of:
the least significant of the binary outpus; or
(the (i+1)$^{th}$ binary output,
said elementary EXOR symmetric function logic for the (i+1)$^{th}$ binary output including the AND logic combination of $2^i$ of the binary inputs in each set for the generation of the ith binary output where i is an integer from 1 to N−1, N is the number of binary outputs and i represents the significance of a binary output.

3. A parallel counter according to claim 1 wherein N is the number of binary outputs, and for the generation of the Nth binary output, said elementary OR symmetric function logic includes said AND logic for combining each said set of binary inputs and said OR logic for combining the AND logic combined sets of binary inputs, and wherein the size k of the sets of binary inputs is $2^{N-1}$.

4. A parallel counter according to claim 1 wherein a least significant of said binary outpus is generated as an elementary EXOR symmetric function using said elementary EXOR symmetric function logic, and an N$^{th}$ of said binary outputs is generated as an elementary OR symmetric function using said elementary OR symmetric function logic, where N is the number of binary outputs and the N$^{th}$ binary output is the most significant.

5. A parallel counter according to claim 1 wherein said logic circuit is arranged to generate two possible binary outputs for a binary output less significant than the N$^{th}$ binary output, as elementary OR symmetric functions of the binary inputs using said elementary OR symmetric function logic for combining a plurality of sets of one or more binary inputs, where N is the number of binary outputs, the sets used for each possible binary output being of two different sizes which are a function of the binary output being generated; and said logic circuit including selector logic to select one of the possible binary outputs based on at least one more significant binary output value.

6. A parallel according to claim 5 wherien said logic circuit is arranged to generate said two possible binary outputs for the (N−1)$^{th}$ binary output which is less significant than the N$^{th}$ binary output, as elementary OR symmetric functions of the binary inputs, the sets used for each possible binary output being of size $2^{N-1} + 2^{N-2}$ and $2^{N-2}$ respectively, and said selector logic being arraned to select one of the possible binary outputs based on the N$^{th}$ binary output value.

7. A parallel counter according to claim 1 wherein said elementary OR or EXOR symmetric function logic includes a plurality of subcircuit logic modules each generating intermediate binary outputs as an elementary OR or EXOR symmetric function of some of the binary inputs, and logic for logically combining the intermediate binary outputs to generate said binary outputs.

8. A logic circuit for multiplying a first N bit binary number with a second N bit binary number, the logic circuit comprising:
array generation logic adapted to generate an array of logical combinations of bits of said first and second N bit binary numbers;
array reduction logic for reducing the depth of the array to two binary numbers; and
addition logic for adding the binary values of the two binary numbers of the reduced array;
wherein said array reduction logic includes at least one parallel counter comprising:
at least five inputs for receiving a plurality of binary inputs, wherein m represents the number of high binary inputs;
at least three outputs for outputting binary outputs indicating the number of binary ones in the plurality of binary inputs; and
a logic circuit connected between the plurality of inputs and the plurality of outputs and for generating at least three of the binary outputs as elementary OR or EXOR symmetric functions of the inputs, wherein said elementary OR symmetric function is generated by elementary OR symmetric function logic comprising at least one of:
  (i) the OR logic combination of the binary inputs and is high if and only if m≧1,
  (ii) the AND logic combination of sets of the binary inputs and the OR logic combinatin of the AND logic combinations and is high if and only if m≧k, where k is the size of the sets of binary inputs, each set being unique and the sets covering all possible combinations of binary inputs, or
  (iii) the AND logic combination of the binary inputs and is high if and only if all said binary inputs are high; and said elementary EXOR symmetric function is generated by elementary EXOR symmetric function logic comprising at least one of
  (i) the EXOR logic combination of the binary inputs and is high if and only if m≧1,
  (ii) the AND logic combination of sets of the binary inputs and the EXOR logic combiantion of the AND logic combinations and is high if and only if m≧k and the number of sets of high inputs is an odd number, where k is the size of the sets of binary inputs, each set being unique and the sets covering all possible combinations of binary inputs, or
  (iii) the AND logic combination of the binary inputs and is high if and only if all said binary inputs are high.

9. A logic circuit for multiplying two binary numbers, the logic circuit comprising:
array generation logic adapted to generate an array of logical combinations of bits of binary numbers,
array reduction logic adapted to reduce depth of the array to two binary numbers; and
addition logic adapted to add the binary values of the two binary numbers of the reduced array;
wherein said array reduction logic includes at least one parallel counter comprising:
at least five inputs to receive a plurality of binary inputs, wherein m represents the number of high binary inputs;
at least three outputs adapted to output binary outputs indicating the number of binary ones in the plurality of binary inputs; and
a logic circuit connected between the plurality of inputs and the plurality of outputs and adapted to generate at least three of the binary outputs as elementary OR or EXOR symmetric functions of the binary inputs,
wherein said elementary OR symmetric function is generated by elementary OR symmetric function logic comprising at least one of:
  (i) the OR logic combination of the binary inputs and is high if and only if m≧1,
  (ii) the AND logic combinatin of sets of the binary inputs and the OR logic combination of the AND logic combinations and is high if and only if m≧k, where k is the size of the sets of binary inputs, each set being unique and the sets covering all possible combinations of binary inputs, or (iii) the AND logic combination of the binary inputs and is high if and only if all said binary inputs are high; and said elementary EXOR symmetric function is generated by elementary EXOR symmetric function logic comprising of one of
  (i) the EXOR logic combination of the binary inputs and is high if and only if $m \geq 1$,
  (ii) the AND logic combination of sets of the binary inputs and the EXOR logic combination of the AND logic combinations and is high if and only if $m \geq k$ and the number of sets of high inputs is an odd number, where k is the size of the sets of binary inputs, each set being unique and the sets covering all possible combinations of binary inputs, or
  (iii) the AND logic combination of the binary inputs and is high if and only if all said binary inputs are high;
wherein said elementary EXOR symmetric function logic is configured to generate at least one of:
the least significant of the binary outputs; or
the $(i+1)^{th}$ binary output, said elementary EXOR symmetric function logic for the (i+1)th binary output including the AND logic combination of $2^i$ of the binary inputs in each set for the generation of the ith binary output, where i is an integer from 1 to N−1, N is the number of binary outputs and i represents the significance of a binary output.

10. A logic circuit for multiplying two binary numbers, the logic circuit comprising:
array generation logic adapted to generate an array of logic combinations of bits of the binary numbers;
array reduction logic adapted to reduce the depth of the array to two binary numbers; and
addition logic adapted to add the binary values of the two binary numbers of the reduced array;
wherein said array reduction logic includes at least one parallel counter comprising:
  at least five inputs adapted to receive a plurality of binary inputs, wherein m represents the number of high binary inputs;
  at least three outputs for outputting binary outputs indicating the number of binary ones in the plurality of binary inputs; and
  a logic circuit connected between the plurality of inputs and the plurality of outputs and adapted to generated at least three of the binary outputs as elementary OR or EXOR symmetric functions of the binary inputs,
wherein said elementary OR symmetric function is generted by elementary OR symmetric function logic comprising at least one of:
  (i) the OR logic combination of the binary inputs and is high if and only if $m \geq 1$,
  (ii) the AND logic combination of sets of the binary inputs and the OR logic combination of the AND logic combinations and is high if and only if $m \geq k$, where k is the size of the sets of binary inputs, each set being unique and the sets covering all possible combinations of binary inputs, or
  (iii) the AND logic combination of the binary inputs and is high if and only if all said binary inputs are high; and said elementary EXOR symmetric function is generated by elementary EXOR symmetric function logic comprising at least one of
    (i) the EXOR logic combination of the binary inputs and is high if and only if $m \geq 1$,
    (ii) the AND logic combination of sets of the binary inputs and the EXOR logic combination of the AND logic combinations and is high if and only if $m \geq k$ and the number of sets of high inputs is an odd number, where k is the size of the sets of binary inputs, each set being unique and the sets covering all possible combinations of binary inputs, or
    (iii) the AND logic combination of the binary inputs and is high if and only if all said binary inputs are high;
wherein N is the number of binary inputs, and for the generation of the Nth binary output, said elementary OR symmetric function logic includes said AND logic for combining each said set of binary inputs and said OR logic for combining the AND logic combined sets of binary inputs, and wheren the size k of the sets of binary inputs is $2^{N-1}$.

11. A logic circuit for multiplying two binary numbers, the logic circuit comprising:
array generation logic for generating an array of logic combinations of bits of the binary numbers;
array reduction logic for reducing the depth of the array to two binary numbers; and
addition logic for adding the binary values of the two binary numbers;
wherein said array reduction logic includes at least one parallel counter comprising:
  at least five inputs for receiving a plurality of binary inputs, wherein m represents the number of high inputs;
  at least three outputs for outputting binary outpus indicating the number of binary ones in the plurality of binary inputs; and
  a logic circuit connected between the plurality of inputs and the plurality of outputs and for generating at least three of the binary outputs as elementary OR or EXOR symmetric functions of the binary inputs,
wherein said elementary OR symmetric function is generated by elementary OR symmetric function logic comprising at least one of:
  (i) the OR logic combination of the binary inputs and is high if and only if $m \geq 1$,
  (ii) the AND logic combination of sets of the binary inputs and the OR logic combination of the AND logic combinations and is high if and only if $m \geq k$, where k is the size of the sets of binary inputs, each set being unique and the sets covering all possible combinations of binary inputs, or
  (iii) the AND logic combination of the binary inputs and is high if and only if all said binary inputs are high; and said elementary EXOR symmetric function is generated by elementary EXOR symmetric function logic comprising at least one of
    (i) the EXOR logic combination of the binary inputs and is high if and only if $m \geq 1$,
    (ii) the AND logic combination of sets of the binary inputs and the EXOR logic combination of the AND logic combinations and is high if and only if $m \geq k$ and the number of sets of high inputs is an odd number, where k is the size of the sets of binary inputs, each set being unique and the sets covering all possible combinations of binary inputs, or
    (iii) the AND logic combination of the binary inputs and is high if and only if all said binary inputs are high;
wherein a least significant of said binary outputs is generated as an elementary EXOR symmetric function using said elementary EXOR symmetric function logic, and an $N^{th}$ of said binary outpus is generated as an elementary OR symmetric function using said elementary OR symmetric function logic, where N is the number of binary outputs and the Nth binary output is the most significant.

12. A logic circuit for multiplying two binary numbers, the logic circuit comprising:
   array generation logic for generating an array of logical combinations of bits of the binary numbers;
   array reduction logic for reducing the depth of the array to two binary numbers; and
   addition logic for adding the binary values of the two binary numbers of the reduced array;
   wherein said array reduction logic includes at least one parallel counter comprising:
      at least five inputs for receiving a plurality of binary inputs, wherein m represents the number of high binary inputs;
      at least three outputs for outputting binary outputs indicating the number of binary ones in the plurality of binary inputs; and
      a logic circuit connected between the plurality of inputs and the plurality of outputs and for generating at least three of the binary outputs as elementary OR or EXOR symmetric functions of the binary inputs,
   wherein said elementary OR symmetric function is generated by elementary OR symmetric function logic comprising at least one of:
      (i) the OR logic combinatin of the binary inputs and is high if and only if $m \geq 1$,
      (ii) the AND logic combination of sets of the binary inputs and the OR logic combination of the AND logic combinations and is high if and only if $m \geq k$, where k is the size of the sets of binary inputs, each set being unique and the sets covering all possible combinations of binary inputs, or
      (iii) the AND logic combination of the binary inputs and is high if and only if all said binary inputs are high; and said elementary EXOR symmetric function is generated by elementary EXOR symmetric function logic comprising at least one of
         (i) the EXOR logic combination of the binary inputs and is high if and only if $m \geq 1$,
         (ii) the AND logic combination of sets of the binary inputs and the EXOR logic combination of the AND logic combinations and is high if and only if $m \geq k$ and the number of sets of high inputs is an odd number, where k is the size of the sets of binary inputs, each set being unique and the sets covering all possible combinations of binary inputs, or
         (iii) the AND logic combination of the binary inputs and is high if and only if all said binary inputs are high;
   wherein said elementary OR symmetric function logic includes interemdiate logic to generate a plurality of possible binary outputs for a binary output less significant than the $N^{th}$ binary output, as elementary OR symmetric functions of the binary inputs, where N is the number of binary outputs, the sets used for each possible binary output being of different sizes which are a function of the binary output being generated; and selector logic to select one of the possible binary outputs based on at least one more significant binary output value.

13. A logic circuit according to claim 12, wherein said intermediate logic includes logic to generate two possible binary outputs for the $(N-1)^{th}$ binary output which is less significant than the $N^{th}$ binary output, as elementary OR symmetric functions of the binary inputs, the sets used for each possible binary output being of size $2^{N-1}+2^{N-2}$ respectively, and said selector logic is arranged to select one of the possible binary outputs based on the $N^{th}$ binary output value.

14. A logic circuit for multiplying two binary numbers, the logic circuit comprising:
   array generation logic for generating an array of logical combinations of bits of the binary numbers;
   array reduction logic for reducing the depth of the array to two binary numbers; and
   addition logic for adding the binary values of the two binary numbers of the reduced array;
   wherein said array reduction logic includes at least one parallel counter comprising:
      at least five inputs for receiving a plurality of binary inputs, wherein m represents the number of high binary inputs;
      at least three outputs for outputting binary outputs indicating the number of binary ones in the plurality of binary inputs; and
      a logic circuit connected between the plurality of inputs and the plurality of binary outputs and for generating at least three of the binary outputs as elementary OR or EXOR symmetric functions of the binary inputs,
   wherein said elementary OR symmetric function is generated by elementary OR symmetric function logic comprising at least one of:
      (i) the OR logic combination of the binary inputs and is high if and only if $m \geq 1$,
      (ii) the AND logic combination of sets of the binary inputs and the OR logic combination of the AND logic combinations and is high if and only if $m \geq k$, where k is the size of the sets of binary inputs, each set being unique and the sets covering all possible combinatins of binary inputs, or
      (iii) the AND logic combination of the binary inputs and is high if and only if all said binary inputs are high; and said elementary EXOR symmetric function is generated by elementary EXOR symmetric function logic comprising at least one of
         (i) the EXOR logic combination of the binary inputs and is high if and only if $m \geq 1$,
         (ii) the AND logic combination of sets of the binary inputs and the EXOR logic combination of the AND logic combinations and is high if and only if $m \geq k$ and the number of sets of high inputs is an odd number, where k is the size of the sets of binary inputs, each set being unique and the sets covering all possible combinations of binary inputs, or
         (iii) the AND logic combination of the binary inputs and is high if and only if all said binary inputs are high;
   wherein said elementary OR symmetric function logic and said elementary EXOR symmetric function logic include a plurality of subcircuit logic modules each generating intermediate binary outputs as an elementary OR or EXOR symmetric function of some of the binary inputs, and logic for logically combining the intermediate binary outputs to generate said binary outputs.

* * * * *